UNITED STATES PATENT OFFICE.

R. O. LOWREY, OF SALEM, NEW YORK.

IMPROVED WATER-PROOF COMPOUND.

Specification forming part of Letters Patent No. 89,056, dated April 20, 1869; antedated March 23, 1869.

*To all whom it may concern:*

Be it known that I, R. O. LOWREY, of Salem, in the county of Washington and State of New York, have invented certain new and useful Improvements in Composition of Matter for Water-Proof Compound; and I do hereby declare that the following is a full, clear, and exact description thereof.

To enable others skilled in the art to construct and use my invention, I will proceed to describe it.

My invention relates to improvements in the composition of matter; and consists in uniting and combining lime, under certain conditions, with grease, oils, or substances containing fatty materials in such a way as to produce a new water-proof compound, which can be usefully employed in many of the arts.

This water-proof compound I make by taking any quantity of quicklime desired, and slake it with water in any suitable vessel, and while the process of slaking is going on, and the lime is still warm and in a mastic or soft state, I add from one to three ounces of grease, oil, or fatty substance of any kind containing the fatty acids, for every pound of the quicklime used, and thoroughly unite and combine them. This compound, so produced, may be kept in the form of a powder or in lumps by drying it, or it may be kept in a liquid state for convenience in storing, or for transportation, or for different uses in different arts.

The proportion of grease to lime, as given, may be varied without materially changing the result, my object being simply to incorporate a sufficient quantity of grease with the lime to give the compound the desired repellent quality. As for some purposes a stronger repellent quality is desired than for others, I vary the quantity of grease used accordingly. For some purposes it is desirable to partially destroy the strength of the lime before or after it is used in the compound. To do this I mix vinegar, acetic or other acids with the water that is used for slaking, or this acid may be added to the compound. In either case the effect will be the same on the lime without in any way weakening the repellent power of the compound.

This compound will be found useful in giving a repellent quality to any articles with which it may be incorporated, or to which it may be applied.

Having thus described my invention, what I claim is—

A water-proof compound made of lime, grease, oil, or fatty substances, when combined substantially as herein described.

R. O. LOWREY.

Witnesses:
   J. McKENNEY,
   P. T. DODGE.